(12) United States Patent
Leone et al.

(10) Patent No.: US 6,484,677 B2
(45) Date of Patent: Nov. 26, 2002

(54) TRANSITIONS AMONG OPERATING MODES IN AN ENGINE WITH A HYBRID VALVETRAIN

(75) Inventors: Thomas George Leone, Dearborn, MI (US); Diana Dawn Brehob, Dearborn, MI (US); John D. Russell, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/079,986

(22) Filed: Feb. 21, 2002

(65) Prior Publication Data

US 2002/0092487 A1 Jul. 18, 2002

Related U.S. Application Data

(62) Division of application No. 09/650,434, filed on Aug. 29, 2000.

(51) Int. Cl.[7] .................................................. F01L 1/34
(52) U.S. Cl. .............................. 123/90.15; 123/90.16; 123/308; 123/432
(58) Field of Search .......................... 123/90.15, 90.11, 123/90.12, 90.13, 90.14, 90.16, 90.17, 308, 315, 432

(56) References Cited

U.S. PATENT DOCUMENTS

| | | | | | |
|---|---|---|---|---|---|
| 3,741,176 | A | * | 6/1973 | Schmidt et al. | 123/90.12 |
| 4,716,863 | A | * | 1/1988 | Pruzan | 123/90.15 |
| 5,211,146 | A | * | 5/1993 | Pischinger | 123/90.15 |
| 5,497,736 | A | * | 3/1996 | Miller et al. | 123/90.13 |
| 5,647,312 | A | * | 7/1997 | Salber et al. | 123/90.16 |
| 5,690,065 | A | * | 11/1997 | Janse van Vuuren | 123/90.16 |
| 5,787,848 | A | * | 8/1998 | Stefanopoulou et al. | 123/90.15 |
| 6,148,779 | A | * | 11/2000 | Hickey | 123/90.15 |
| 6,182,621 | B1 | * | 2/2001 | Salber et al. | 123/90.15 |
| 6,189,512 | B1 | * | 2/2001 | Kawasaki et al. | 123/90.15 |
| 6,276,316 | B1 | * | 8/2001 | Arai et al. | 123/90.11 |
| 6,283,074 | B1 | * | 9/2001 | Takahashi et al. | 123/90.15 |

* cited by examiner

*Primary Examiner*—Henry Bennett
*Assistant Examiner*—Fadi H. Dahbour
(74) *Attorney, Agent, or Firm*—Diana D. Brehob; Allan J. Lippa

(57) ABSTRACT

A method for controlling intake valves in an internal combustion with intake valves operated by more than one type of actuation device includes steps to accomplish smooth transitions among intake valve operating modes.

20 Claims, 11 Drawing Sheets

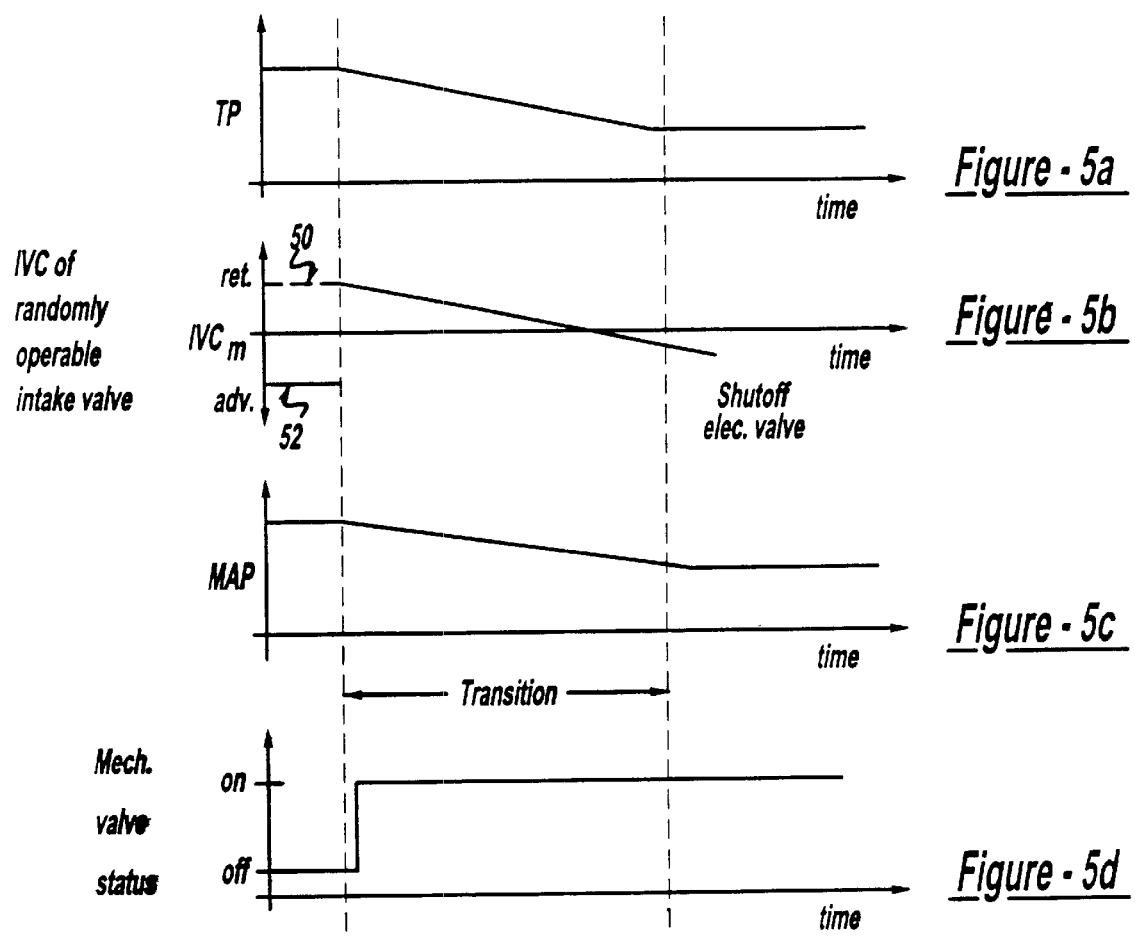

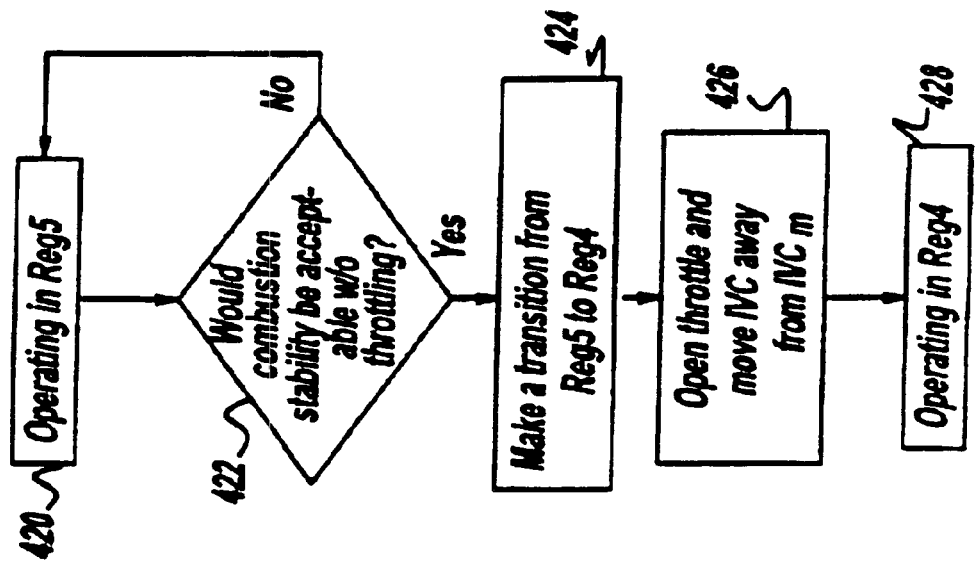
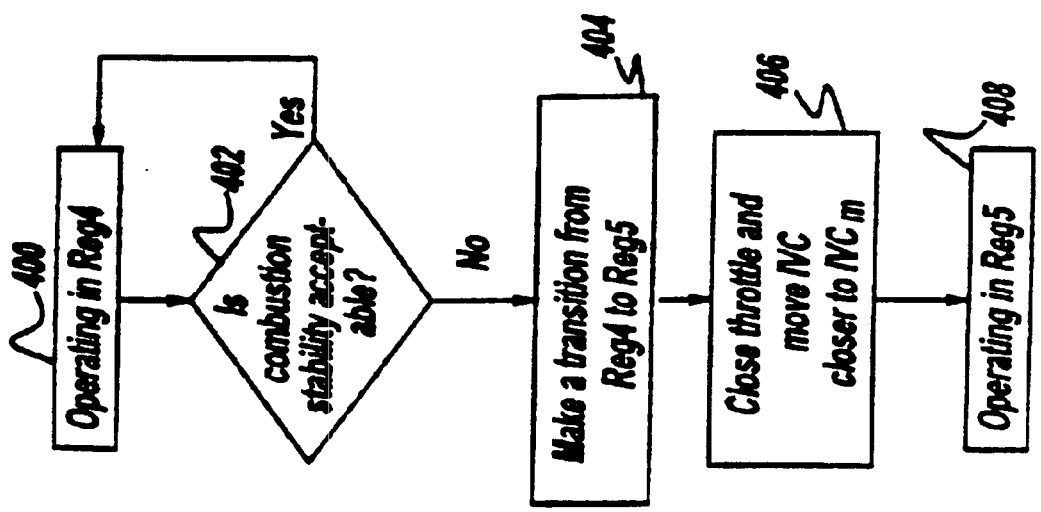
Figure - 9

US 6,484,677 B2

TRANSITIONS AMONG OPERATING MODES IN AN ENGINE WITH A HYBRID VALVETRAIN

CROSS-REFERENCE TO RELATED APPLICATIONS

This is a division of Application No. 09/650,434, filed Aug. 29, 2000.

FIELD OF THE INVENTION

The present invention relates to a control method for engine valve actuation.

BACKGROUND

In U.S. Pat. No. 6,009,841, an engine with a hybrid valvetrain is disclosed in which one intake valve is actuated by a source other than a camshaft. This first intake valve is randomly operable meaning that the valve opening and closing events are independent of engine crankshaft position, thus, a fully variable valve. A second intake valve is actuated by a camshaft and includes a deactivator. Operation of the second valve may be discontinued or restored within one engine cycle, termed selectable intake valve herein. The exhaust valve(s) of the hybrid valvetrain is conventionally camshaft actuated. As disclosed in U.S. Pat. No. 6,009,841, the advantage of such a system over fully camless engine operation is improved fuel economy.

In U.S. Pat. No. 6,009,841, the method is described in which air is admitted using a randomly operable intake valve when the engine is operating in a lowest range in torque, using a selectable intake valve when the engine is operating in a medium range in torque, and using both the randomly operable intake valve and the selectable intake valve when the engine is operating in a highest range in torque.

In U.S. Pat. No. 5,647,312, a method is described in which air is admitted using a randomly operable intake valve when the engine is operating in a lower range in torque and speed and air is admitted using a selectable intake valve when the engine is operating at higher speed or higher torque.

Both U.S. Pat. No. 6,009,841 and U.S. Pat. No. 5,647,312 teach that making transitions among operating modes involves activating and deactivating valves. The inventors herein have recognized that by simply turning valves on and off leads to large excursions in engine torque which would be noticeable and annoying to the operator. The inventors herein have also recognized that the potential for hybrid valvetrain fuel economy benefits, as disclosed in U.S. Pat. No. 6,009,841, depends on suitable methods to accomplish transitions between operating modes; otherwise, the fuel efficiency potential is unrealized.

SUMMARY OF THE INVENTION

A method for controlling an internal combustion engine, the engine containing at least one cylinder, a randomly operable intake valve, a selectable intake valve with a predetermined closing time, a throttle valve in the engine's intake system, and an engine control unit, is provided. The method includes the steps of providing a randomly operable intake valve closing time which is after the predetermined valve closing and initiating operation of the selectable intake valve. In a further step, the throttle valve is closed and the randomly operable intake valve closing time is advanced so that substantially constant engine torque is provided.

A method for controlling an internal combustion engine, the engine containing at least one cylinder, a randomly operable intake valve, a selectable intake valve with a predetermined valve closing time, a throttle valve in the engine's intake system, and an engine control unit, has a first step of activating the randomly operable intake valve with a closing time after the predetermined valve closing time and a second step of opening the throttle valve and retarding the randomly operable intake valve closing time.

A method for controlling an internal combustion engine, the engine containing at least one cylinder, a randomly operable intake valve, a selectable intake valve with a predetermined valve closing time, a throttle valve in the engine's intake system, and an engine control unit, has a first step of advancing a randomly operable intake valve closing time and closing the throttle valve and a second step of ceasing operation of the randomly operable intake valve when additional advancement of the randomly operable intake valve closing time has no appreciable effect on inducted air remaining in the cylinder after closing of the randomly operable intake valve.

A method for controlling an internal combustion engine, the engine containing at least one cylinder, a randomly operable intake valve, a throttle valve in the engine's intake system, and an engine control unit, has the steps of closing the throttle valve and advancing a randomly operable intake valve closing time, in the event that the randomly operable intake valve closing time is retarded from a predetermined valve closing time and closing the throttle valve and retarding a randomly operable intake valve closing time, in the event that the randomly operable intake valve closing time is advanced from the predetermined valve closing time. The predetermined valve closing time is that which maximizes air inducted which is retained in the cylinder after closing of the randomly operable intake valve.

A method for controlling an internal combustion engine, the engine containing at least one cylinder, a randomly operable intake valve, a throttle valve in the engine's intake system, and an engine control unit, has the steps of opening the throttle valve and advancing a randomly operable intake valve closing time, in the event that the randomly operable intake valve closing time is advanced from a predetermined valve closing time and opening the throttle valve and retarding a randomly operable intake valve closing time, in the event that the randomly operable intake valve closing time is retarded from the predetermined valve closing time.

The advantages of the above methods are numerous. The transitions among operating modes provide a smooth torque trajectory. Thus, the transitions are not detectable by the operator. The time over which a transition occurs is brief, two to twenty engine cycles. The methods disclosed herein permit realization of the fuel efficiency potential of an engine with a hybrid electric valvetrain.

Other advantages, as well as objects and features of the present invention, will become apparent to the reader of this specification.

BRIEF DESCRIPTION OF THE DRAWINGS

FIG. 5a illustrates a time history of throttle position for a transition according to one aspect of the present invention;

FIG. 5b illustrates a time history of randomly operable intake valve closing for a transition according to an aspect of the present invention;

FIG 5c illustrates a time history of manifold absolute pressure for a transition according to an aspect of the present invention;

FIG 5d illustrates a time history of mechanical valve status for a transition according to an aspect of the present invention;

FIG. 9 is a flowchart of steps involved in making a transition between medium load in engine torque and lowest load in engine torque according to an aspect of the present invention.

DETAILED DESCRIPTION OF PREFERRED EMBODIMENTS

Figure 1:
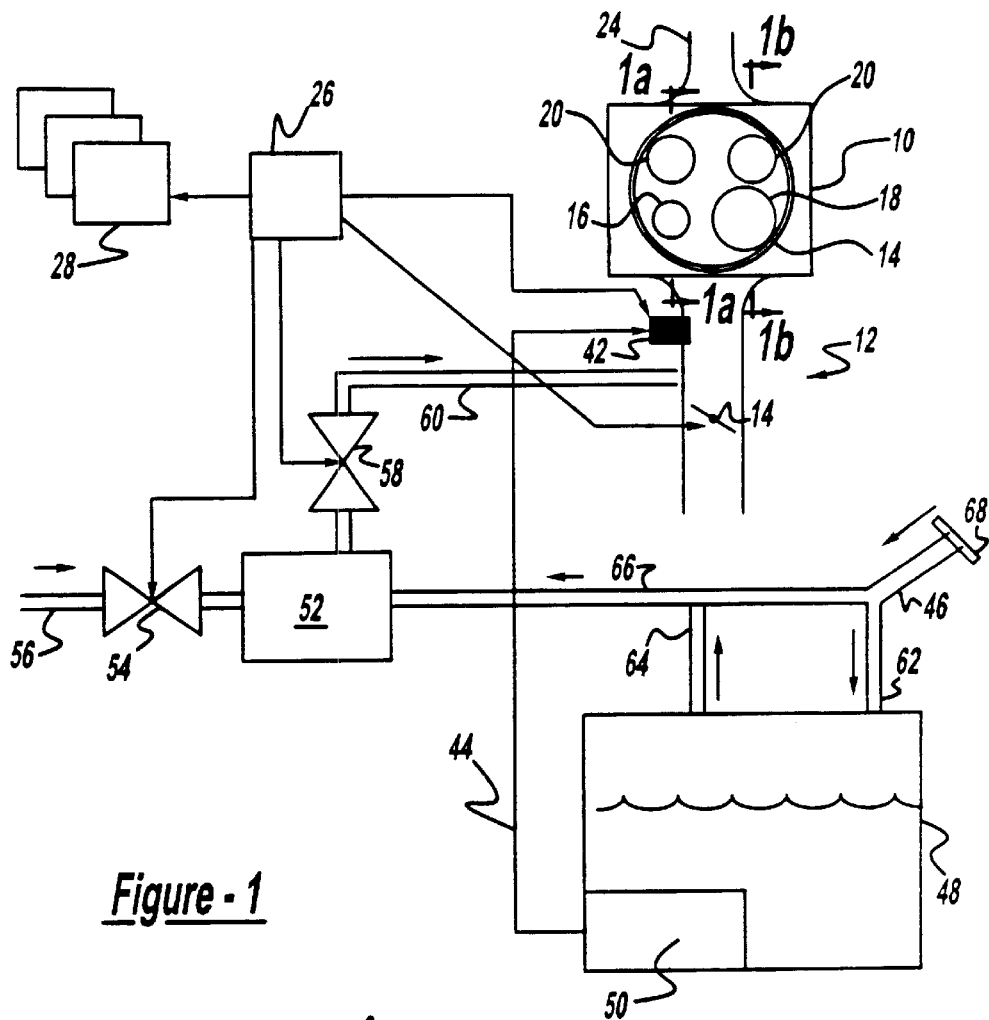
FIG. 1 is a schematic of a hybrid valvetrain engine showing cross-sections of the cylinder head and the fuel vapor recovery and purge system to which aspects of the present invention apply.

Referring to FIG. 1, engine 10 contains at least one cylinder 4. The cylinder head of engine 10 contains selectable intake valve 18, randomly operable intake valve 16, and exhaust valves 20. Throttle valve 14 is disposed in the intake 12 to engine 10. Combusted gases are rejected through exhaust line 24. Engine control unit 26 is used to: activate and deactivate the selectable intake valve 18, actuate the randomly operable intake valve 16, and control the position of the electronically controlled throttle valve 14. Various engine sensors 28, such as an exhaust gas oxygen sensor, a mass air flow sensor, and an engine speed sensor, provide signals to the engine control unit 26.

Figure 1A:
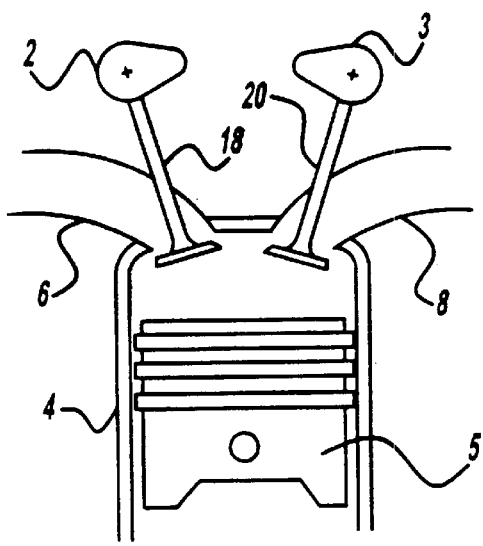
FIG. 1A is a cross-section schematic of the cylinder head with the cross-section taken through the selectable intake valve.
Figure 1B:
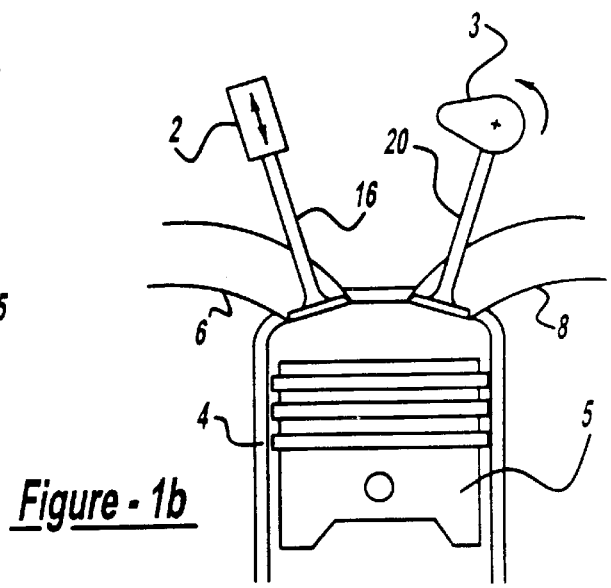
FIG. 1B is a cross-section schematic of the cylinder head with the cross-section taken through the randomly operable intake valve.

Referring now to the cross-section shown in FIG. 1A, the selectable intake valve 18 and the exhaust valve 20 are camshaft actuated by camshafts 2 and 3, respectively. As such, the timing of the events is based on engine rotational position. In the cross-section shown in FIG. 1B, the randomly operable intake valve 16 is driven by an electromechanical actuator. An electrohydraulic actuator may also be used. The valve events of the randomly operable intake valve 16 are fully flexible and controlled by the engine control unit 26. The exhaust valve 20 is actuated by camshaft 3. Also shown in FIGS. 1A and 1B are a piston 5 which reciprocates within the cylinder 4, an intake port 6, and an exhaust port 8. Intake ports 6 and exhaust ports 8 are coupled to respective intake and exhaust manifolds (not shown) to form respective intake line 12 and exhaust line 24.

A conventional fuel vapor recovery and purge system for an automotive type engine also is shown in FIG. 1. Engine 10 communicates with an intake 12 and an exhaust 24. Fuel is metered into the intake by a fuel injector 42. The throttle valve 14 is situated in the intake line 12. The fuel tank. 48 contains an in-tank fuel pump 50 which supplies fuel through a fuel supply line 44 to the fuel injector 42. The fuel tank 48 is replenished through the fuel filler tube 46; fuel cap 68 is removed to allow filling. The liquid components of the fuel fall through tube 62. Gaseous components may proceed through vapor recovery line 66. During fuel tank 48 filling, the volume not containing liquid fuel is occupied by gaseous components which are pushed into the vapor recovery lines 64 and 66 by the entering liquid fuel. The vapor recovery lines 64 and 66 lead to the carbon canister 52 which contains activated carbon to absorb fuel vapors. The carbon canister 52 is purged regularly. Purging is accomplished by opening valves 54 and 58 which allows fresh purge air to flow through the fresh purge air intake line 56. The gases exiting carbon canister 52 contains both fresh air and fuel vapors which proceed through valve 58 and line 60. Line 60 is introduced into the intake 12 downstream of the throttle valve 14. Flow from the carbon canister circuit, through elements 56, 54, 52, 58, and 60, into the intake 12 and ultimately to the engine 10 for combustion occurs under the conditions of a vacuum in the intake 12 downstream of the throttle valve 14.

Figure 2:
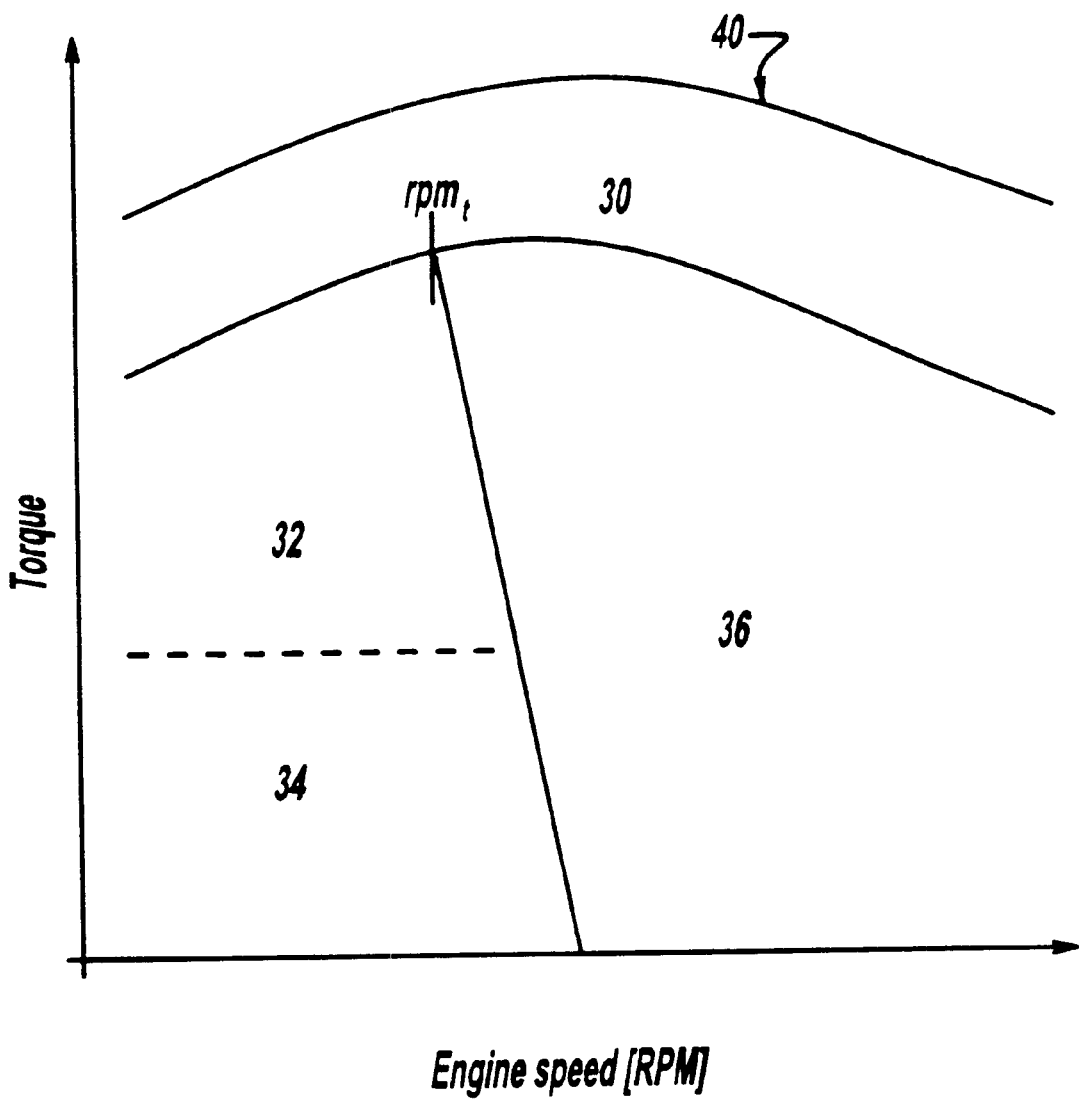
FIG. 2 is a typical engine operating map onto which the regions employing the different modes of hybrid valvetrain operation are illustrated.

In FIG. 2, an operating map of a typical spark-ignited engine is displayed. The upper curve 40 represents the maximum torque that the engine delivers as a function of speed. Operating regions are shown at which the randomly operable valve operates along, the selectable valve operates alone, and both valves operate. At higher torque across all speeds, region 30, both intake valves are employed. Using both intake valves admits the maximum air possible thereby allowing the engine to develop its maximum torque. If intake air is admitted through one valve solely, the velocity through that intake port and valve is roughly twice as high as admitting the fresh charge through two valves, if the valves are of comparable size. This leads to higher turbulence in the cylinder at the time of combustion. Although high turbulence is a desirable condition at marginal combustion conditions, it leads to excessively rapid combustion or combustion harshness at robust operating conditions exemplified by region 30. In region 36 of FIG. 2, the selectable intake valve 18 only is employed. Region 36 does not require maximum airflow as maximum torque is not demanded. Region 30 is to be selected when region 36 cannot admit sufficient airflow or when the combustion is too harsh using the selectable intake valve 18 only.

Criteria are provided for determining when a transition is desired. The decision when to make a transition from region 36 to region 32 or region 34 is based on whether the selectable intake valve 18 or the randomly operable intake valve 16 provides more efficient operation. Efficiency is based on energy consumed in rotating the intake camshaft, energy consumed in actuating the randomly operable intake valve 16, and pumping losses, that is, the energy consumed in replenishing spent combustion gases with a fresh charge.

Figure 3A:
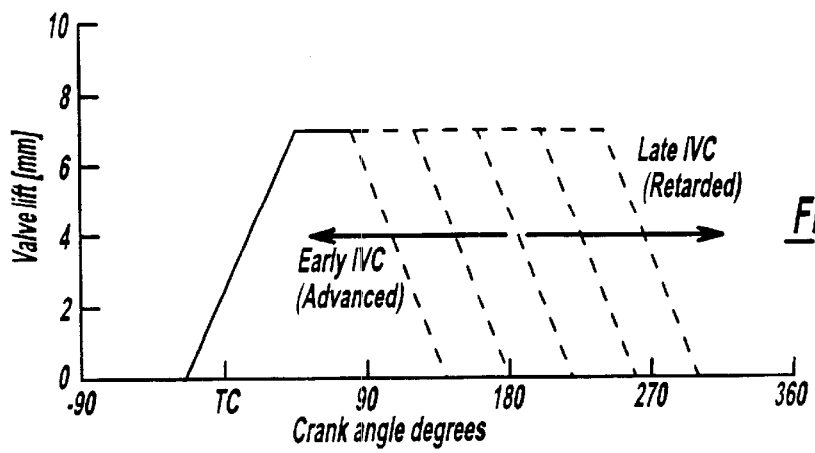
FIG. 3a is a graph of randomly operable intake valve lift profiles for advanced and retarded closing times according to an aspect of the present invention.
Figure 3B:
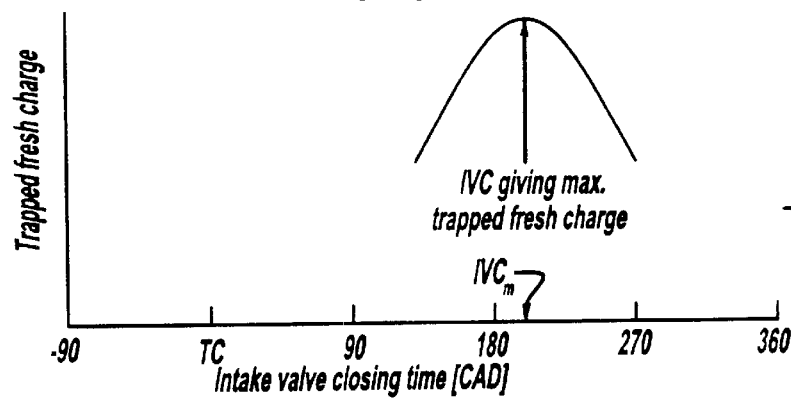
FIG. 3b is a graph of intake valve closing time -showing the quantity of fresh charge trapped in the cylinder.

Region 32 is a region in which the intake valve closing of the randomly operable intake valve 16 can be adjusted to match the demand for engine torque. Lift profiles for the randomly operable intake valve 16 are shown in FIG. 3a. The intake valve closing time can be advanced or retarded from the timing which provides the maximum trapped fresh charge, as shown in FIG. 3b. By tailoring the intake valve closing time, the desired fresh charge is trapped. As shown in FIG. 3b, both retarding and advancing intake valve closing lessen the quantity of trapped fresh charge. In the case of retarded closing time, some of the inducted fresh air charge is pushed out of the combustion chamber prior to intake valve closing. The amount of fresh air retained in the cylinder is plotted in FIG. 3b.

Figure 3C:
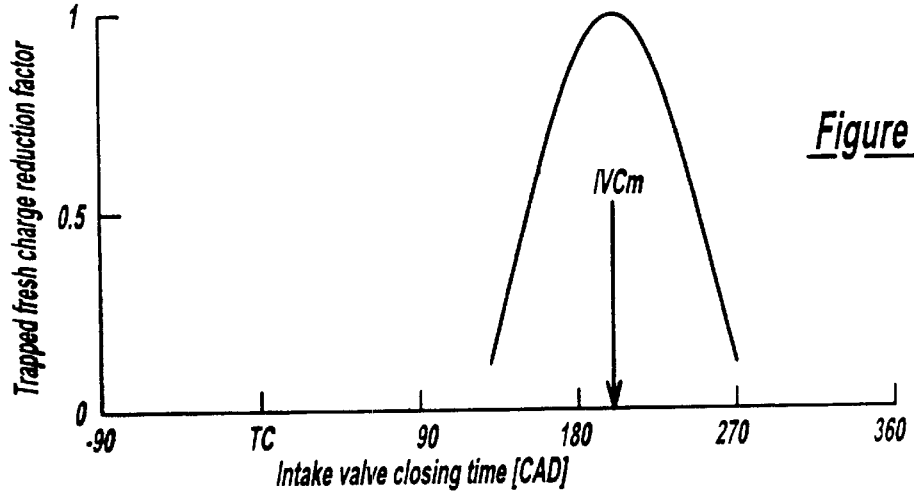
FIG. 3c is a graph of intake valve closing time showing the trapped fresh charge reduction factor according to an aspect of the present invention.

At retarded intake valve closing times the fresh charge temperature is increased; this is in contrast to advanced intake valve closing times which have little effect on fresh charge temperature, as shown in FIG. 3c. There may be reasons to prefer advancement or retardation of closing time which will become apparent in the development of the method. Nevertheless, controlling engine torque by adjusting intake valve closing time is preferred over throttling because it lessens pumping losses and hence leads to higher overall efficiency. As demanded torque is reduced, engine torque control by adjusting the closing time of the randomly operable intake valve 16 may lead to unstable combustion. Depending on the combustion stability desired for a particular application, a torque level may be determined, below which engine torque control is accomplished by throttling. Thus, the distinction between regions 32 and 34 is that throttling is employed within region 34.

Combustion stability is related to the standard deviation of the power produced within a cylinder on a cyclic basis. A low standard deviation, that is, constant power produced from cycle to cycle, indicates stable combustion and vice versa. Herein, degradation in combustion stability refers to an increase in the standard deviation and an improvement in combustion stability refers to a decrease in the standard deviation.

Within region 34 of FIG. 2, it is desirable to mitigate the level of throttling necessary to control engine torque. Thus, the intake valve closing is as far advanced or retarded, depending on control method being employed, as possible while maintaining satisfactory combustion stability. It may be found that as engine torque is reduced (within region 34), i.e., the throttle valve is closed, the intake valve closing time must be altered to provide continued robust combustion.

As the demand for engine torque or engine speed changes during the course of operation, it will be found desirable to move between regions in FIG. 2. The transition among the various regions of operation should be imperceptible to the operator of the vehicle.

A transition from region 32 to 34 is provided when the combustion stability in region 32 becomes poorer than desired. A smooth transition from region 32 to region 34 is accomplished by closing the throttle valve to attain the desired torque level.

The transition from region 32 to region 30 is provided when the valve closing time of the randomly operable intake valve 16 is at that which provides the maximum trapped fresh charge. It may be found that it is desirable to cause a transition from region 32 to 30 based on a limit imposed by tolerable combustion harshness rather than running out of authority in intake valve closing time of the randomly operable valve. Further increase in engine torque is achieved by activating the selectable intake valve 18. Simultaneously, the randomly operable intake valve time is retarded such that the air flow before and after the transition cycle is substantially constant.

Engine torque control in region 30 is achieved by controlling the valve closing time of the randomly operable intake valve 16. As illustrated in FIG. 2b, torque can be managed by late intake valve closing of the randomly operable intake valve 16, whereas, early intake valve closing has minimal effect on the trapped charge.

A transition from region 36 to region 30 is desired when the selectable intake valve 18 alone does not supply sufficient fresh air charge. When a transition is demanded, the randomly operable intake valve 16 is activated with a retarded closing time in which trapped fresh charge is unaffected. The closing time of the randomly operable intake valve 16 is advanced to increase trapped fresh charge mass as needed. The reverse transition (from region 30 to region 36) is accomplished when the trapped fresh charge could be provided by the selectable intake valve 18 alone. It may be found that instead of basing the transition on capacity constraint the combustion harshness is the determining factor. That is, there may be operating conditions that the selectable intake valve 18 alone can provide sufficient fresh charge, but the resulting combustion harshness is beyond a desired level. In this case, a transition from region 36 to region 30 is accomplished based on combustion harshness.

Region 32 or 34 is preferred over region 36 when the following equation holds true:

$$PW_{roiv}+W_{roiv}+FW'_{siv}+CL_{roiv}>PW_{siv}+FW_{siv}+CL_{siv}$$

in which $PW_{roiv}$ is the pumping work of the engine with the randomly operable intake valve 16, $W_{roiv}$ is the work extracted from the engine to drive the randomly operable intake valve 16, $PW_{siv}$ is the pumping work of the engine using only the selectable intake valve 18, $FW_{siv}$ is the friction work lost in driving the selectable intake valve 18, $FW'_{siv}$ is the friction work lost in driving the camshaft of the actuated intake valve when the selectable intake valve 18 is deactivated. $FW'_{siv}$ is considerably less than $FW_{siv}$, but not negligible, due to rotational friction in the camshaft even when the selectable intake valve 18 is deactivated. $CL_{roiv}$ and $CL_{siv}$ are cycle losses associated with operating the randomly operable and selectable intake valves, respectively. Cycle losses are difference between the ideal cycle work that could obtained for an Otto cycle and the actual amount generated. The actual work generated is less than ideal cycle work due to heat transfer, combustion time losses (i.e., finite combustion duration), combustion phasing, and others. The choice between using the selectable intake valve 18, region 36, and using the randomly perable intake valve 16, regions 32 and 34, is based on minimizing the losses due to valve actuation and pumping work. When the above equation is violated, the control system selects region 36; i.e., the selectable intake valve 18 is actuated only.

The quantities described above may be computed or estimated in the following ways. Pumping work (PW) is a function of manifold pressure, engine rpm, and engine displacement primarily and could be contained in a lookup table or in equation form in the engine's control unit. The energy loss associated with driving the intake camshaft is primarily a function of engine rpm. This is a quantity which could be measured in a representative engine and the data applied to all engines of the same type. This could be lookup table or an equation in the engine's control unit. There would be two distinct tables or equations, one for the case with the selectable intake valve 18 activated and for the case when it is deactivated. The power that is absorbed from the engine to actuate the randomly operable intake valve 16 is a quantity that would be determined in the course of the development of the randomly variable intake valve. The design variables that would affect the power requirement is the size of the valve, the lift profile that is selected, and the drivers used to actuate the valve. For example, a faster valve lift expends more energy. The factors external to the valve design that would determine the power consumption is the efficiency of the engine alternator in generating electrical power, system losses in storing and retrieving energy, losses in transforming voltage, and pressure in the cylinder at the time of valve actuation. All of these quantities, except for cylinder pressure, depend on the system design. Thus for a given design, the power consumed in actuating the randomly operable intake valve 16 is a function of cylinder pressure primarily. Other dependencies may be determined in- the course of development. The randomly operable intake valve 16 alternatively may be actuated electro-hydraulically or by other means. In the electro-hydraulic case, power is consumed in driving a pump used to develop hydraulic fluid pressure, hydraulic losses in system lines (highly dependent on hydraulic fluid temperature), and electrical losses in actuating controlling solenoid valves as well as the effect of the lift profile, valve size, and cylinder pressure effects mentioned above.

Accomplishing the transition between regions 32 or 34 to region 36 is shown in the timeline shown in FIG. 5. If at the time of the transition, the randomly operable intake: valve 16 is operating with an advanced closing time, in the next engine cycle, a retarded closing time is selected which traps the same mass of fresh charge. In FIG. 3b, trapped fresh charge decreases on both sides of the peak. Thus, there is a retarded timing which can be selected in which trapped fresh charge and, thus, developed engine torque- matches that of the advanced timing. In the next engine cycle, the selectable intake valve 18 can be enabled. The trapped fresh charge is not appreciably affected by activating the selectable intake valve 18 when the randomly operable intake valve 16 is operating at retarded valve closing time. Over the next engine cycles, the randomly operable intake valve closing time is advanced simultaneously as the throttle valve is closed. These operations are controlled in concert such that the trapped fresh charge is substantially constant herein meaning providing substantially constant engine torque or changing smoothly along the desired torque trajectory. A change in intake valve closing time of the randomly operable intake valve 16 can be accomplished in a single engine cycle. In contrast, even though a change in throttle valve position can be accomplished rapidly, intake manifold filling considerations cause the intake manifold pressure to react over several engine cycles. Thus, the transition illustrated in FIG. 4 occurs in a matter of a few to a couple dozen engine cycles. As the timing of the randomly operable intake valve 16 continues to be advanced, eventually it no longer has an affect on the amount of trapped fresh charge. At which point, it can be turned off.

The reverse transition (region 36 to region 32 or region 34 of FIG. 2) occurs analogously: the randomly operable intake valve 16 is activated at an advanced timing in such a manner to not impact trapped fresh charge. The closing time of the randomly operable intake valve 16 is retarded concurrently with opening the throttle such that the trapped fresh charge is substantially constant. When the randomly operable valve closing time is sufficiently retarded, the selectable intake valve 18 is no longer having any affect on the trapped fresh charge and may be turned off.

The distinction between making a region 32 to region 36 transition and a region 34 to region 36 transition is that the initial throttle position is fully open and the initial manifold pressure is atmospheric in the former case and partially open, i.e., less than atmospheric, in the latter case.

It is desirable to limit the number of transitions which the engine's control unit must manage. Thus, as the demanded engine torque and speed approaches a new region (within FIG. 2), the transition may be delayed until the demanded engine torque and speed traverse the border by a predetermined amount. The boundaries of FIG. 2 can be considered to be bands. As a boundary is approached, the transition is not made until the demanded operating condition exceeds the farther edge of the boundary. That is, a transition from region 36 to region 30 would occur at the higher engine torque edge of the boundary between the two regions. Conversely, a transition from region 30 to region 36 would occur at the lower engine torque edge of the boundary between the two regions.

Transitions among regions of FIG. 2 which involve closing or opening the throttle valve, may require a minimum of one and as many as 20 engine revolutions due to manifold filling lags. The throttle valve can be actuated on the order of 100 ms. However, causing air to fill the manifold takes multiple engine revolutions to overcome the inertia of the gases.

Herein, substantially constant engine torque means either a constant torque or a trajectory in torque along the desired path; i.e., engine torque deviation from the desired trajectory is small or unnoticeable to the operator of the vehicle.

Retarding or advancing spark timing is a powerful tool which can be used to smooth transitions. The advantage of spark advance is that it can be changed in one engine cycle. Furthermore, spark timing has a wide range of authority in controlling engine torque. Spark timing, however, negatively impacts fuel economy, typically. Thus, it is a secondary tool to refine transitions.

A quantity which may be determined in development is $rpm_t$ (identified in FIG. 2) which is the threshold rpm between regions 32 and 36. This quantity is discussed below in regard to the control strategy employed in selecting among regions for operation.

FIG. 3a shows valve lift profile for early and late closing time of the randomly operable intake valve 16. FIG. 3b indicates the resulting trapped fresh charge as a function of the closing time of the randomly operable intake valve 16. A maximum trapped fresh charge occurs at a particular valve closing time. At valve closing times advanced or retarded from that maximum reduce the quantity of trapped fresh charge. The amount of trapped fresh charge is the primary factor determining the amount of torque that the engine produces. When only the randomly operable intake valve 16 is operating, either a retarded timing or an advanced timing may be selected to give a particular desired trapped fresh charge. The trapped fresh charge can be normalized by dividing the trapped fresh charge at any given intake valve closing time. (IVC) by maximum trapped fresh charge. The normalized quantity is termed trapped fresh charge reduction factor. As shown in 3c, trapped fresh charge reduction factor ranges between 0 and 1.

Figure 3D:
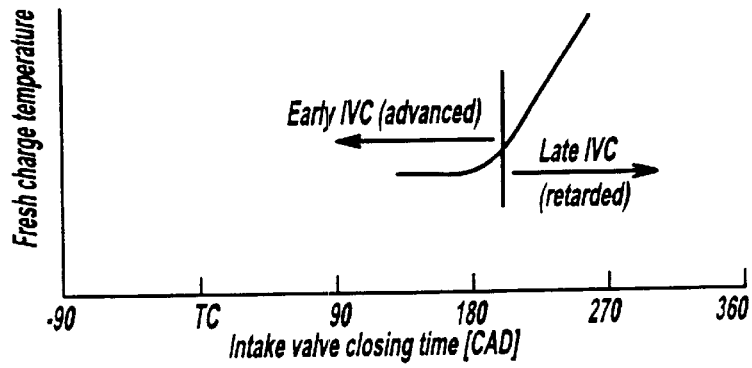
FIG. 3d is a graph of intake valve closing time showing the temperature of the trapped fresh charge.

When operating within region 34 of FIG. 2, the primary method by which engine torque is controlled is by throttling and secondarily by intake valve close timing. As shown in FIG. 3b, either an advanced or retarded valve close timing could be used to provide a desired trapped fresh charge. In FIG. 3d, the resulting fresh charge temperature is shown. At advanced timings, the fresh charge temperature is substantially constant; whereas, fresh charge temperature increases as a function of retardation. This is due to the fact that at advanced timings, the intake valve is closed prematurely to limit the amount of trapped fresh charge. At retarded timings, the cylinder is filled with fresh charge and as the piston moves up, the fresh charge is pushed out of the cylinder. In this case, the fresh charge comes in contact with the hot cylinder surfaces and hot intake valve multiple times and is heated more than the advanced intake valve closing time case. Higher fresh charge temperature may be found to be beneficial in improving combustion stability. Thus, within region 36, in which combustion stability is a concern, retarded closing time of the randomly operable intake valve 16 may be preferred due to improved combustion stability.

Figure 4A:
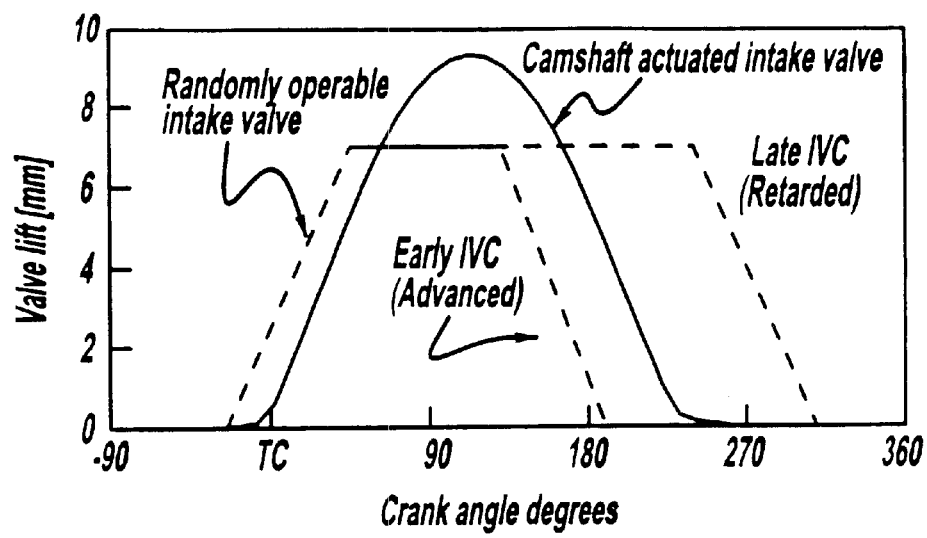
FIG. 4a is a graph of valve lift profiles for both randomly operable and selectable valves.
Figure 4B:
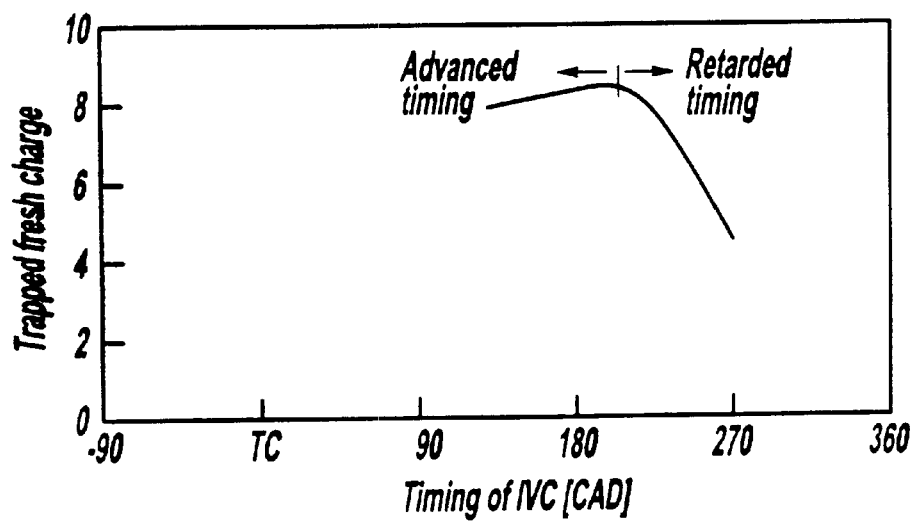
FIG. 4b is a graph showing the effect on trapped fresh charge of varying randomly operable intake valve closing when the selectable intake valve is operated concurrently.

FIG. 4a shows the valve lift profiles for operation with both the selectable intake valve 18 and the randomly operable intake valve 16. FIG. 4b indicates the resulting trapped fresh charge as a function of the closing time of the randomly operable intake valve 16. A maximum trapped fresh charge occurs at a particular valve closing time of the randomly operable intake valve 16. At times advanced of the maximum, a very slight reduction in trapped fresh charge may occur. That is, the randomly operable intake valve 16 does not have substantive authority over trapped fresh charge by advancing the closing time. In FIG.4b, the randomly operable intake valve 16 closing time does have a range of authority over trapped fresh charge when the closing time is retarded beyond the closing time of the selectable valve, i.e., retarded timing.

In FIG. 2, the regions among which the engine control unit must select operation are illustrated. In addition to providing control within each region, smooth transitions between regions must be managed. A time line of a transition between region 32 to region 34 is outlined in FIGS. 5a–d. If the randomly operable intake valve 16 is operating at an advanced timing 50, it must be switched to a retarded timing which provides identical trapped fresh charge at the start of the transition, as shown in FIG. 5b. The ability to find a retarded timing which provides the same trapped fresh charge as an advanced timing is supported by FIG. 3a, as discussed above. If the randomly operable intake valve 16 is operating at a retarded timing 52, no action is necessary. The selectable valve can be opened in the same engine cycle or shortly thereafter, FIG. 5c. The throttle valve (designated TP for throttle position in FIG. 5a) is closed. Simultaneously, the randomly operable intake valve closing time is retarded, FIG. 5d, such that the desired trajectory in engine torque is achieved. As the randomly operable intake valve timing is retarded beyond a certain point, it is no longer impacting the quantity of trapped fresh charge. At this point, the randomly operable intake valve 16 can be turned off, FIG. 4b.

For the purposes of discussing the control strategy, region 30 of FIG. 1 is called region three, region 36 of FIG. 1 is called region two, and the combined region containing both regions of 32 and 34 of FIG. 2 is called region one. For purposes of discussing control strategy in FIG. 9, region 32 and 34 of FIG. 2 are termed regions four and five, respectively.

Figure 6:
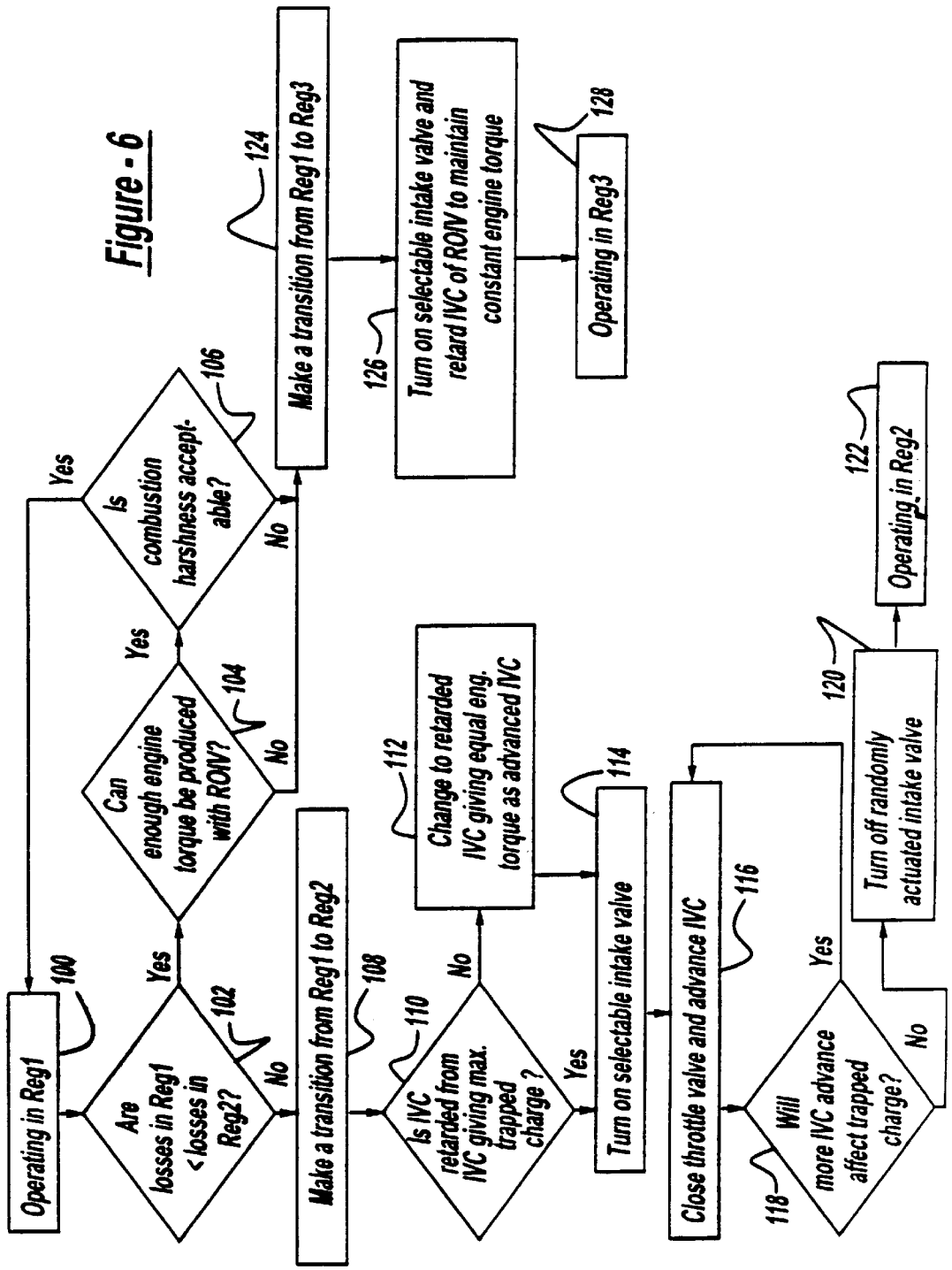
FIG. 6 is a flowchart of steps involved in making a transition from a region of lower engine speed and lower engine torque to other operating conditions according to an aspect of the present invention.

FIG. 6 indicates the steps that would be taken to assess whether a transition from region one were called for and then to make the transition. The system is operating in region one in block 100. Blocks 102, 104, and 106 are assessment steps as to whether a transition is warranted. The order in which assessment blocks 102, 104, and 106 occur is arbitrary. In block 102, the losses operating in region 1 compared to losses operating in region two are evaluated. These losses are described above as consisting of all losses associated with operating the selectable intake valve 18 compared to the randomly actuated intake valve. The object of block 102 is to select the more efficient operating region. If region two is more efficient, a transition from region one to region two is accomplished beginning in block 108. The intake valve timing of the randomly operable intake valve 16 is compared to that which would give maximum trapped fresh charge in block 110. If the timing is advanced from the maximum trapped fresh charge condition, the intake valve timing is changed to a retarded intake valve timing which gives substantially similar trapped fresh charge in block 112. The selectable intake valve 18 is activated in block 114. The purpose for the change from an advanced timing to a retarded timing in block 112 is illustrated in FIGS. 3 and 4. With only the randomly operable intake valve 16 activated as in FIG. 3, trapped fresh charge drops on both sides of the maximum. But, with both valves open as in FIG. 4, trapped fresh charge remains substantially constant on the advanced side and drops on the retarded side. To allow valve timing a range in authority in controlling trapped fresh charge, the randomly operable intake valve 16 should be operating at a retarded timing. In block 116, the throttle valve is closed concurrently with advancing the valve closing time of the randomly operable intake valve 16. This is accomplished such that engine torque is substantially constant. Block 118 is a check to determine whether the closing time of the randomly operable intake valve 16 is sufficiently advanced such that it no longer has authority over fresh trapped charge. If not, block 116 is repeated. When the test in block 118 fails, the randomly actuated intake valve can be turned off in block 120 because it no longer affects engine torque. Block 122 indicates that the engine is operating within region two.

In block 102 of FIG. 6, if losses in region one are less than region two, checks 104 and 106 are made. In block 104, a check is made to determine if the randomly operable intake valve 16 admits sufficient trapped fresh charge so that demanded engine torque can be satisfied. If not, a transition from region one to region three is requested in block 124. If the test of block 104 is passed, an additional test is made in block 106 to determine if the combustion harshness is acceptable. Because the randomly operable intake valve 16 induces more turbulence in the combustion gases than when intake gases are inducted through both valves, the resulting combustion can become too rapid or harsh. In block 106, existence of harsh combustion causes a request for a transition from region one to region three. The selectable intake valve 18 is turned on after the randomly operable intake valve close timing is retarded in block 126. The closing time for the randomly operable intake valve 16 is selected so that substantially constant engine torque is achieved during the transition of block 130. Now the engine is operating in region three in block 128.

Figure 7:
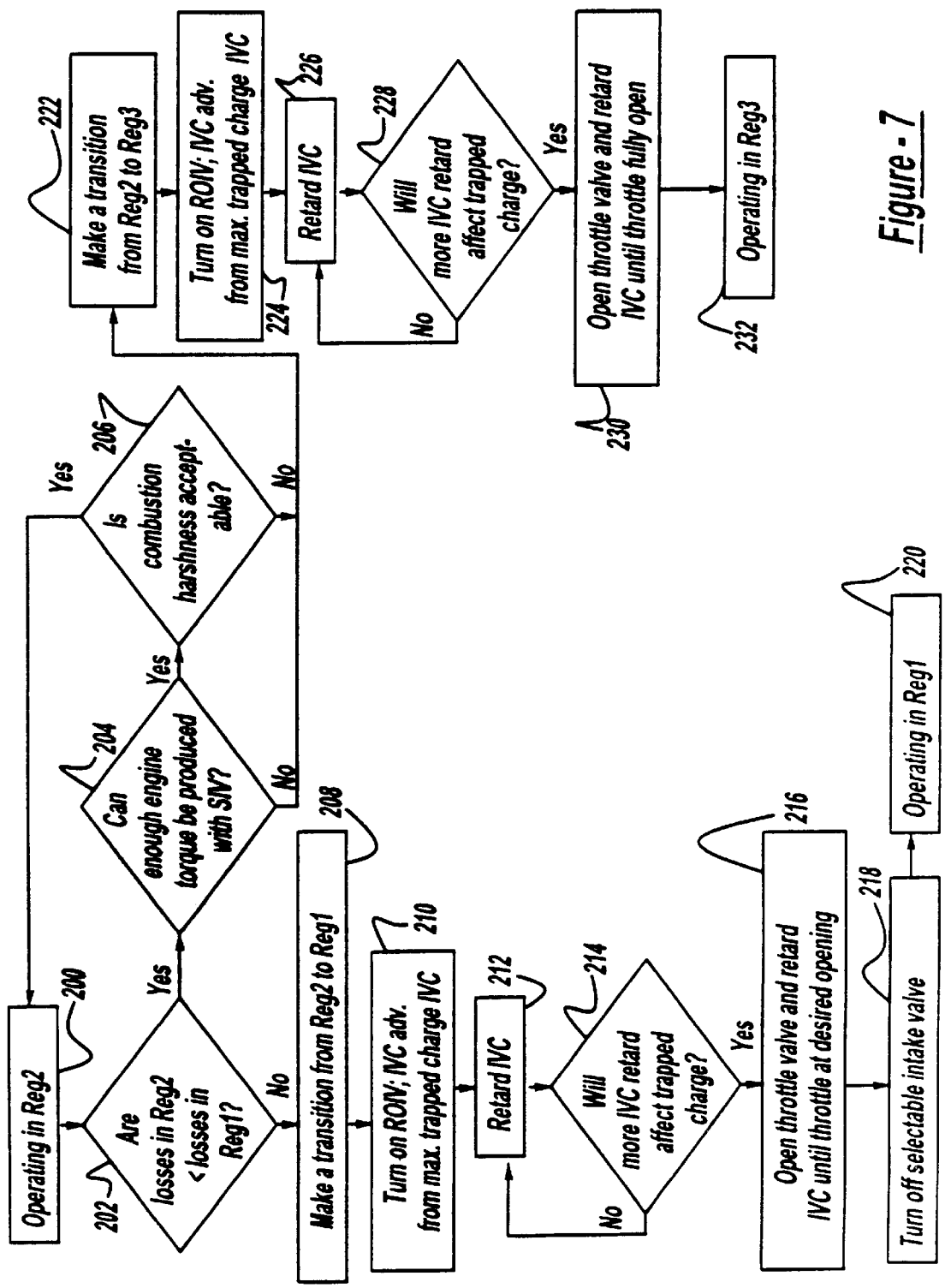
FIG. 7 is a flowchart of steps involved in making a transition from a region of higher engine speed and lower engine torque to other operating conditions according to an aspect of the present invention.

FIG. 7 shows steps involved in checking for and making transitions from operating region two, block 200. The checks to determine if a transition is warranted are blocks 202, 204, and 206, which can performed in any order. Block 202 checks whether region one or two is more efficient. If region one is more efficient, a transition from region two to region one is requested, block 208. The randomly operable intake valve 16 is activated with a closing time advanced of maximum trapped fresh charge in block 210. By advancing the closing time, the randomly operable intake valve 16 has a minimal effect on trapped fresh charge. The closing time is retarded in block 212 until in block 214 further retardation would affect trapped fresh charge. When block 214 is satisfied, the randomly operable intake valve closing time is retarded concurrently with opening the throttle valve, block 216. This is accomplished such that engine torque remains substantially constant until the desired throttle opening is achieved. The selectable intake valve 18 may be turned off as shown in block 218. Blocks 216 and block 218 may be accomplished in arbitrary order. Now the engine is operating in region one, block 220.

In block 202 of FIG. 7, if the losses of region two re less than those of region one, checks are made in blocks 204 and 206 to determine whether sufficient engine torque can be developed using the selectable intake valve 18 alone and whether combustion harshness is acceptable, respectively. If either of these checks fails, a transition from region two to region three is demanded, block 222. The randomly operable intake valve 16 is turned on with an advanced closing time. The valve closing time is retarded in block 226 with a check to see if further retardation will affect trapped fresh charge, block 228. When the test of block 228 passes, the intake valve timing is retarded further while the throttle valve is opened in such a manner to maintain substantially constant engine torque in block 230. The throttle is opened fully or to a lesser opening depending, if desired to support other functions. The engine is now operating within region three, block 232.

Figure 8A:
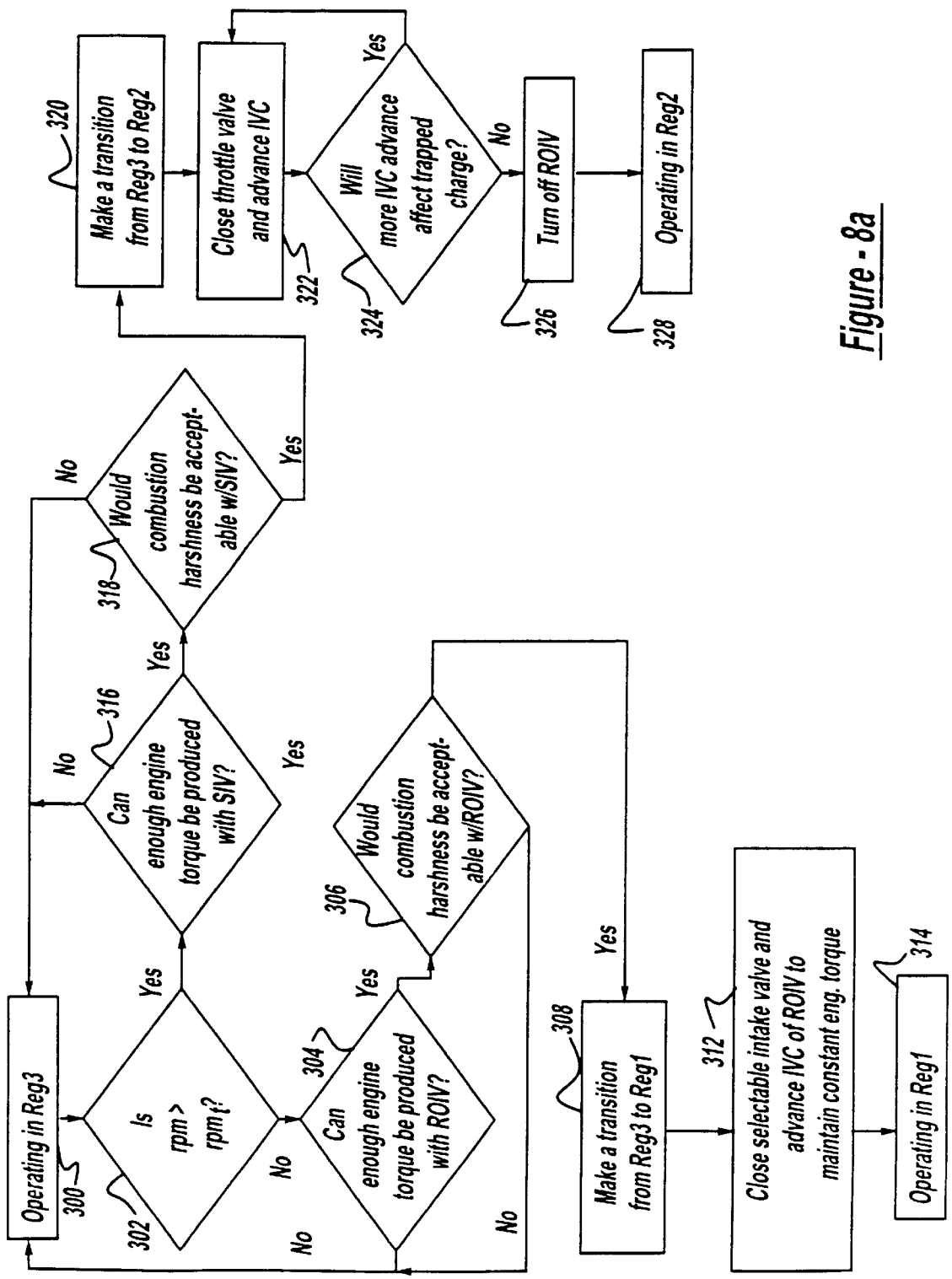
FIG. 8a is a flowchart of steps involved in making a transition from a region of higher engine torque to other operating conditions according to an aspect of the present invention.

FIG. 8a shows steps involved in checking for and making transitions from operating region three, block 300. Blocks 302, 304, 306, 316 and 318 are checks to determine if a transition is warranted. In block 302, the current rpm is compared to $rpm_t$, which is a predetermined value of rpm which indicates the boundary between regions one and two ($rpm_t$ is shown in FIG. 2.) The purpose of step 302 is to determine if a transition is made whether it is to region one or region two. If rpm is less than $rpm_t$, then checks in block 304 and 306 determine whether enough engine torque can be produced and whether combustion harshness would be acceptable with the randomly operable intake valve 16. If either check 304 or 306 fail, control is returned to block 300. If both checks 304 and 306 pass, a transition to region one is made in block 308. In block 312, the selectable intake valve 18 is closed, the randomly operable intake valve 16 is advanced to maintain engine torque. If rpm is greater than $rpm_t$, checks 316 and 318 are made to determine whether enough engine torque can be produced and whether combustion harshness would be acceptable with the selectable intake valve 18. Failure in either check 316 or 318 returns control to block 300, operating region three. If both check 316 and 318 pass, a transition to region two is requested in block 320. The throttle valve is closed and the closing time of the randomly operable intake valve 16 is advanced in block 322. A check in 324 determines whether further advancement of the closing time of the randomly operable intake valve 16 affects trapped charge. If so, return to block 322. If not, deactivate the randomly operable intake valve 16 in block 326 and the system is now operating within region two in block 328.

Figure 8B:
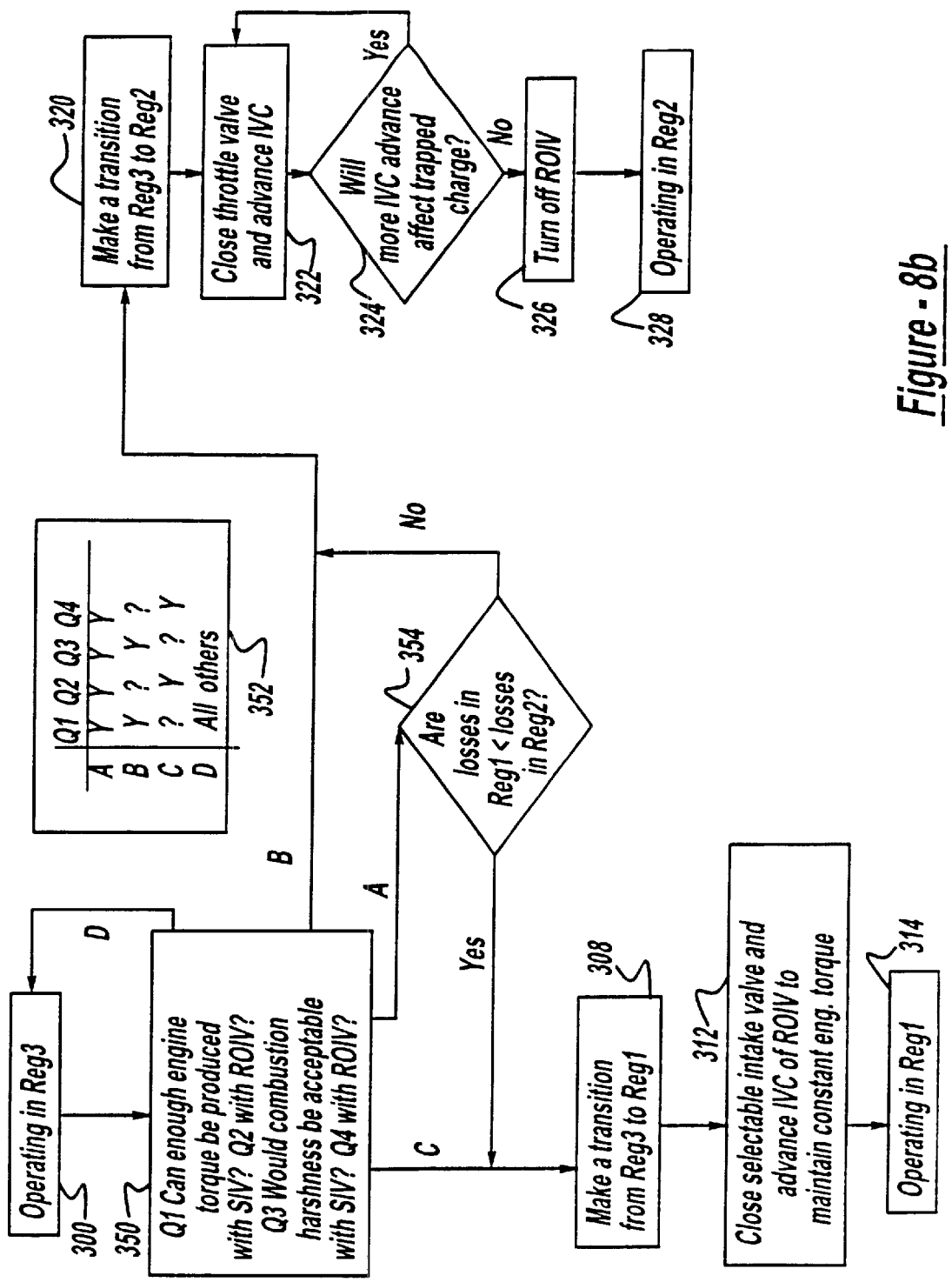
FIG. 8b is a flowchart of steps involved in making a transition from a region of higher engine torque to other operating conditions according to an aspect of the present invention.

FIG. 8b indicates an alternative to FIG. 8a. Blocks 302, 304, 306, 316, and 318 of FIG. 8a are replaced with blocks 350, 352, and 354 of FIG. 8b. In block 350, four questions with binary responses are asked. Question one is "can enough engine torque be produced with the selectable intake valve 18." Question two is "can enough engine torque be produced with the randomly operable intake valve 16." Question three is "whether combustion harshness would be acceptable with the selectable intake valve 18." Question four is "whether combustion harshness would be acceptable with the randomly operable intake valve 16." Block 352 shows the direction of control based on the responses of the four questions. Control proceeds along path A if the four answers are all positive or yes. Path A leads to block 354 in which a check is made to determine if the losses in region one are less than losses in region two. If positive result from block 354, a transition from region three to region one is demanded, block 308. If negative, a transition from region three to region two is demanded, block 320. Control proceeds along path B if the answers to questions one and three are positive and either one or both of the answers to questions two and four are negative. Path B calls for a transition from region three to region two, block 320. Similarly, a positive answer to both questions two and four (with either one or both answers to questions one and three negative) leads to control along path C which leads to block 312, a transition from region three to region one. Any other result than those discussed above, leads to result D which is a return to block 300, operating region three. The remaining control steps of FIG. 8b are discussed above in regard to FIG. 8a.

In FIG. 9, if operating within region four, block 400, a transition would be requested when combustion stability is unacceptable, block 402. To make the transition block 404, the throttle valve is closed while the randomly operable intake valve closing time is advanced maintaining substantially constant engine torque, block 406. The engine is operating within region five, block 408.

If operating within region five, block 420 of FIG. 9, a check is made to determine if combustion stability would be acceptable without throttling, block 422. If so, a transition from region five to region four is requested, block 424. The throttle is opened while intake valve closing time is retarded such that substantially constant engine torque is developed during the transition in block 426. The engine is now operating within region four, block 428.

In FIG. 8, checks are made in blocks 316 and block 304 to determine whether enough engine torque can be produced with the selectable intake valve 18 and the randomly operable intake valve 16, respectively. Checks are made concerning combustion harshness in blocks 306 and 318. It may be found in the course of development that combustion harshness, torque production, or other measure is the sole criteria by which a transition should be demanded. The strategies discussed in relation to FIGS. 6–9 may be simplified in accordance.

An algorithm to calculate throttle position and intake valve closing for transitions involving a throttle change to be disposed in the electronic control unit is outlined below. Specifically, transitions involving a throttle valve change are any transitions involving region 36 and transitions between regions 32 and 34 of FIG. 2. Desired trapped fresh charge (des_trp_chg) depends on demanded or desired engine torque (des_tq) and engine speed (rpm), i.e., $$des\_trp\_chg = fnc(des\_tq, \text{rpm}).$$

In an engine with fixed valve events, des_trp_chg, and desired manifold pressure (des_MAP) are related by $$des\_MAP = a * des\_trp\_chg + b$$

where a and b are functions of rpm.

In an engine with flexible valve events, the effect of valve timing can be included as $$des\_MAP = c * des\_trp\_chg / trp\_chg\_rf + d \quad (1)$$

where c and d are functions of rpm and trp_chg_rf is a trapped fresh charge reduction factor, defined as.

$$trp\_chg\_rf = trp\_chg(IVC) / trp\_chg(IVC_m)$$

where $trp\_chg(IVC)$ is the trapped fresh charge at the given IVC and $trp\_chg(IVC_m)$ is the trapped fresh charge at $IVC_m$, which is the IVC which gives the maximum trapped fresh charge. IVC is intake valve closing time. It is apparent from FIG. 3c, that trp_chg_rf ranges between 0 and 1 and that $$trp\_chg\_rf = fnc(IVC)$$

at a given MAP and rpm.

Or, in the general case, trp_chg_rf=fnc (IVC, MAP, rpm), the detailed form of the equation will be determined in development.

Solving for trp_chg_rf in equation 1 above, $$trp\_chg\_rf = (c * des\_trp\_chg) / (des\_MAP - d) = fnc(IVC, MAP, rpm).$$

As mentioned above, the relationship between IVC and trp_chg_rf is not known, a priori. However, given such a relationship, the equation can be solved for IVC. IVC depends on $$IVC = fnc(, MAP, des\_trp\_chg, rpm).$$

The desired throttle position (TP) is related to MAP through sonic and subsonic relationships. These relationships are known to one skilled in the art and are the subject of U.S. Pat. No. 5,526,787, which is assigned to the assignee of the present invention and which is incorporated by reference herein. It is covered, also, within "Internal Combustion Engine Fundamentals" by J. B. Heywood (McGraw Hill, 1988), which is hereby incorporated by reference herein.

$$TP = fnc(MAP, rpm).$$

The relationships above hold for a single operating condition. However, transitions which involve opening or closing the throttle valve (between region 36 and another other region of FIG. 2) occur over an interval and require concurrent ramping of IVC and throttle position. The invention herein uses a ramp in MAP to define ramps in IVC and TP. MAP is ramped based on the desired final MAP (des_MAP) and the current or initial MAP ($MAP_i$). A change in throttle position, with a typical electronically controlled throttle valve, can occur much faster than the manifold pressure can react due to the inertia of the gases. Depending on the magnitude of the change desired and engine speed, it may take from about one to twenty engine cycles for the manifold pressure to reach its equilibrium level. The desire for smooth transitions among regions of FIG. 2 suggests that the ramp in MAP be sufficiently slow such that manifold filling lag is minimal. A linear ramp in MAP may be preferred with the end points defined by $MAP_i$ and des_MAP and the slope determined by manifold filling considerations. The ramp in MAP is MAP(t). The ramps in both IVC and TP are based on this ramp in MAP with the additional constraint of delivering des_trp_chg. Thus, IVC(t) and TP(t) can be computed based on manifold pressure ramp and desired trapped fresh charge:

$$IVC(t) = fnc(MAP(t), des\_trp\_chg, rpm)$$

and $$TP(t) = fnc(MAP(t), des\_trp\_chg, rpm)$$

with rpm as a given.

Figure 10:
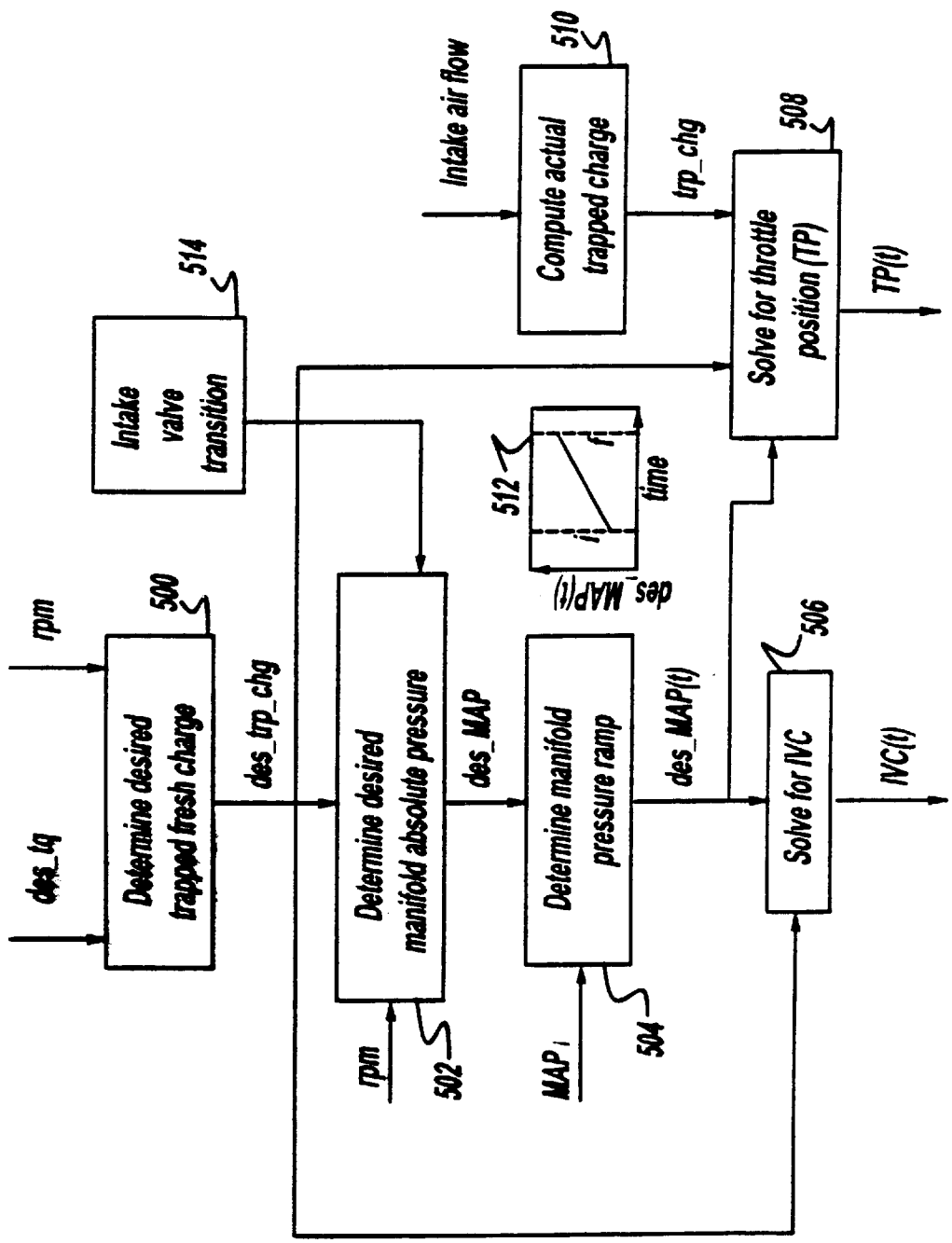
FIG. 10 is a flowchart of a method by which inputs of demanded engine torque and rpm. can be used to compute intake valve closing and throttle valve position as functions of time to command to actuators according to an aspect of the present invention.

In FIG. 10, the steps in computing IVC(t) and TP(t) are outlined. Inputs to block 500 are the desired or demanded torque, des_tq, and engine speed, rpm. Within block 500, the desired trapped fresh charge (des_trp_chg) is computed. In block 502, the desired manifold pressure (des_MAP), that is, the final MAP at the completion of the transition, is computed with des_trp_chg, rpm, and the operational status of the intake valves at the end of the transition. The operational status of the intake valves for a transition from region 36 to region 30 of FIG. 2 is for both the randomly operable intake valve 16 and the selectable intake valve 18 to be activated. Within block 504, the ramp in MAP, des_MAP(t), is computed with inputs of initial MAP, $MAP_i$, and des_MAP. As discussed above, a MAP trajectory may be linear, block 512, and takes into account intake manifold filling considerations. The desired MAP trajectory characteristics may be reduced to an algorithm and disposed within the engine's control unit. The output of block 504, des_MAP(t), along with des_trp_chg are inputs to both blocks 506 and 508 in which IVC(t) and TP(t) are computed, respectively. Typical automotive engine control systems incorporate a measure of delivered fresh charge, shown as block 510. Measured fresh charge is input to block 510 in which trapped fresh charge can be computed. The actual trapped fresh charge is input to block 508 allowing error checking and updating of the throttle position equations or lookup tables.

Referring again to FIG. 1, modern automotive vehicles are equipped with vapor recovery and purge systems to manage fuel vapors evolving from the liquid fuel in the fuel tank 48 due to temperature cycling and due to fuel vapors that are displaced in the process of refilling the fuel tank. The system contains a carbon canister 52 which absorbs the fuel vapors. When a purge is called for by the engine's electronic control unit 26, fresh air is drawn through the canister 52. The fresh air and desorbed vapors are inducted into the engine entering the engine on the downstream side of the throttle valve 14. Purge vapors are drawn through the engine by virtue of the vacuum or depressed pressure in the intake 12.

As conventional automotive spark-ignition, internal combustion engines 10 are throttled under most operating conditions, scheduling carbon canister purge is not usually an impediment. Additional measures must be taken to purge an internal combustion engine 10 with a hybrid valvetrain. Within region 32 (FIG. 2), in an internal combustion engine 10 with a hybrid valvetrain the throttle 14 is open. Thus, there is no vacuum in the intake 14 (FIG. 1). If the engine control unit calls for a purge, the throttle 14 may be closed to accommodate the need to purge the carbon canister 52. To overcome the torque reduction caused by closing the throttle 14, the closing time of the randomly actuated intake valve 16 is changed to allow induction of sufficient trapped fresh charge to meet the demand for engine torque. When the engine control unit determines that the carbon canister 52 has been purged, the throttle valve 14 may be reopened while concurrently altering the closing time of the randomly actuated intake valve 16 to meet demanded engine torque. A transition to purging while operating within region 32 of FIG. 2 can be accomplished in the same manner as a transition from region 32 to region 34 as discussed above. The distinction is that the transition is requested based on a need to purge the vapor recovery system rather than combustion stability. Analogously, a transition from a purge is accomplished the same as a transition from region 34 to region 32 described above.

In high torque operating region 30 in FIG. 2, throttling is not employed. It may be possible to schedule purging of the fuel vapor purge system such that sufficient purge time would be scheduled outside region 30. In normal engine operation, region 30 is rarely accessed. However, if purging were desired, the approach described above for purging region 32 would apply to region 30 with the distinction that region 30 cannot tolerate as much throttling due to the need to develop high torque.

While the best mode for carrying out the invention has been described in detail, those familiar with the art to which this invention relates will recognize alternative designs and embodiments for practicing the invention. Thus, the above-described preferred embodiment is intended to be illustrative of the invention, which may be modified within the scope of the following claims.

What is claimed is:

1. A method for controlling an internal combustion engine, the engine having at least one cylinder, at least one randomly operable intake valve, a throttle valve disposed in an air intake system of said engine, and an engine control unit, said method comprising the steps of:
   closing the throttle valve and advancing a closing time of said randomly operable intake valve, in the event that said closing time of the randomly operable intake valve is retarded from a predetermined valve closing time; and
   closing the throttle valve and retarding a closing time of the randomly operable intake valve, in the event that said closing time of the randomly operable intake valve is advanced from said predetermined valve closing time.

2. The method according to claim 1, wherein said predetermined valve closing is a closing time which maximizes air inducted which is retained in the cylinder after closing of the randomly operable intake valve.

3. The method according to claim 1, wherein said closing of the throttle valve and said closing time of the randomly operable intake valve are selected so that engine torque is substantially constant.

4. The method according to claim 1, wherein a first operating mode precedes said closing of the throttle valve, said first operating mode characterized by a first relationship between engine speed and engine torque.

5. The method according to claim 4, wherein a second operating mode succeeds said closing of the throttle valve, said second operating mode characterized by a second relationship between engine speed and engine torque wherein for a given engine speed said first operating mode provides a higher engine torque than said second operating mode.

6. A method for controlling an internal combustion engine, the engine having at least one cylinder, at least one randomly operable intake valve, a throttle valve disposed in an intake valve system of said engine, and an engine control unit, said method comprising the steps of:
   opening the throttle valve and advancing a closing time of the randomly operable intake valve, in the event that said closing time of the randomly operable intake valve is advanced from a predetermined valve closing time; and
   opening the throttle valve and retarding said closing time of the randomly operable intake valve, in the event that said closing time of the randomly operable intake is retarded from said predetermined valve closing time.

7. The method according to claim 6, wherein said predetermined valve closing time is a closing time which traps maximum fresh charge.

8. The method according to claim 6, wherein said opening of the throttle valve and said closing time of the randomly operable intake valve are selected so that engine torque is substantially constant.

9. The method according to claim 6, wherein a first operating mode precedes said opening of the throttle valve, said first operating mode characterized by a first relationship between engine speed and engine torque.

10. The method according to claim 9, wherein a second operating mode succeeds said opening of the throttle valve, characterized by a second relationship between engine speed and engine torque, wherein at a given engine speed said second operating mode provides higher engine torque than said first operating mode.

11. A system for controlling an internal combustion engine, the engine having at least one cylinder and a throttle valve disposed in an air intake, comprising:
   a randomly operable intake valve coupled to the cylinder; and
   an electronic control unit operably connected to the engine, the throttle valve, and said randomly operable intake valve, said electronic control unit commands the throttle valve to close and commands said randomly operable intake valve to close at an advanced timing when said closing time of said randomly operable intake valve is retarded from a predetermined valve closing time.

12. The system of claim 11, wherein said electronic control unit commands said randomly operable intake valve to close at a retarded timing when said closing time of said randomly operable intake valve is advanced from a predetermined valve closing time.

13. The system of claim 12 wherein said predetermined valve closing time is a closing time trapping maximum fresh air in the cylinder.

14. The system of claim 12 wherein a first operating mode precedes said closing of the throttle valve, a second operating mode follows said closing of the throttle valve, and said first operating mode provides a higher engine torque than said second operating mode.

15. The system of claim 14 wherein said closing time of said randomly operable intake valve provides a smooth torque trajectory between said first operating mode and said second operating mode.

16. A system for controlling an internal combustion engine, the engine having at least one cylinder and a throttle valve disposed in an air intake, comprising:
   a randomly operable intake valve coupled to the cylinder; and
   an electronic control unit operably connected to the engine, the throttle valve, and said randomly operable intake valve, said electronic control unit commands the throttle valve to open and commands said randomly operable intake valve to close at a retarded timing when said closing time of said randomly operable intake valve is retarded from a predetermined valve closing time.

17. The system of claim 16, wherein said electronic control unit commands said randomly operable intake valve to close at an advanced timing when said closing time of said randomly operable intake valve is advanced from a predetermined valve closing time.

18. The system of claim 17 wherein said predetermined valve closing time is a closing time trapping maximum fresh air in the cylinder.

19. The system of claim 17 wherein a first operating mode precedes said closing of the throttle valve, a second operating mode follows said closing of the throttle valve, and said first operating mode provides a lower engine torque than said second operating mode.

20. The system of claim 19 wherein said closing time of said randomly operable intake valve provides a smooth torque trajectory between said first operating mode and said second operating mode.

* * * * *